US011771926B2

(12) United States Patent
Maarschalk et al.

(10) Patent No.: US 11,771,926 B2
(45) Date of Patent: Oct. 3, 2023

(54) RESCUE TOOL

(71) Applicant: JPM BEHEER B.V., Lisse (NL)

(72) Inventors: Jan-Pieter Maarschalk, Amsterdam (NL); Sebastiaan Mollema, Utrecht (NL); Fred Baas, Nieuw-Vennep (NL)

(73) Assignee: ZAMQUA HOLDING B.V., Lisse (NL)

( * ) Notice: Subject to any disclaimer, the term of this patent is extended or adjusted under 35 U.S.C. 154(b) by 0 days.

(21) Appl. No.: 15/577,105

(22) PCT Filed: May 27, 2016

(86) PCT No.: PCT/NL2016/050386
§ 371 (c)(1),
(2) Date: Nov. 27, 2017

(87) PCT Pub. No.: WO2016/190745
PCT Pub. Date: Dec. 1, 2016

(65) Prior Publication Data
US 2018/0178045 A1 Jun. 28, 2018

(30) Foreign Application Priority Data

May 27, 2015 (NL) .................................... 2014868

(51) Int. Cl.
*A62B 3/00* (2006.01)
*F16H 25/22* (2006.01)
(Continued)

(52) U.S. Cl.
CPC .............. *A62B 3/005* (2013.01); *B23D 29/00* (2013.01); *F16H 1/28* (2013.01); *F16H 25/2252* (2013.01);
(Continued)

(58) Field of Classification Search
CPC ........ A62B 3/005; B23D 29/00; B23D 17/04; F16H 2025/2075; F16H 1/28; F16H 25/2252; F16H 57/10
See application file for complete search history.

(56) References Cited

U.S. PATENT DOCUMENTS 1,613,126 A * 1/1927 Reichel .................. B23D 29/00
30/228
2,341,494 A * 2/1944 Williamson ........... B23D 15/14
83/380

(Continued)

FOREIGN PATENT DOCUMENTS

WO WO-2014009363 A1 1/2014
WO WO-2014145980 A1 9/2014
(Continued)

OTHER PUBLICATIONS

SKF Rolling Bearings Catalogue, Needle roller/Angular contact ball bearings, p. 780. (Year: 2016).*

(Continued)

*Primary Examiner* — Robert F Long
*Assistant Examiner* — Eduardo R Ferrero
(74) *Attorney, Agent, or Firm* — Perry + Currier Inc.

(57) ABSTRACT

A rescue tool (10) comprises a drive system which is provided inside a housing and which is configured and suitable for actuating a linear displacement of an implement drive member. The drive system is connected for axial rotation to a rotation shaft of an energizable drive source (22), wherein the rotation shaft of the energizable drive source (22) is coupled for force transmission to an axially rotatable spindle (30). The spindle (30) is coupled rotatably to the housing (15) by means of an axial bearing assembly (25, 26) and the drive body (40) is coupled for force transmission to the spindle (30) and to the implement drive (Continued)

member. The drive body is configured and suitable for converting an axial rotation of the spindle (30) to a linear translation of its own.

11 Claims, 12 Drawing Sheets

(51) Int. Cl.
  *B23D 29/00* (2006.01)
  *F16H 1/28* (2006.01)
  *F16H 57/10* (2006.01)
  *F16H 25/20* (2006.01)
  *B23D 17/04* (2006.01)
  *B23D 7/04* (2006.01)

(52) U.S. Cl.
  CPC .............. *F16H 57/10* (2013.01); *B23D 7/04* (2013.01); *F16H 2025/2075* (2013.01); *F16H 2025/2084* (2013.01)

(56) References Cited

U.S. PATENT DOCUMENTS

| | | | | |
|---|---|---|---|---|
| 4,392,263 A * | 7/1983 | Amoroso | ............... | A62B 3/005 29/566.1 |
| 4,428,710 A * | 1/1984 | Grisebach | ................ | B25J 9/04 414/590 |
| 4,685,354 A * | 8/1987 | McCabria | ............... | H02K 7/10 475/5 |
| 5,080,635 A * | 1/1992 | Martinez | ............. | F16H 37/0826 475/5 |
| 5,272,811 A * | 12/1993 | Armand | ................ | A62B 3/005 30/228 |
| 5,297,780 A * | 3/1994 | Hickerson | .............. | A62B 3/005 254/124 |
| 5,956,992 A * | 9/1999 | Patton | ................ | B23D 29/005 72/392 |
| 5,993,303 A * | 11/1999 | Fladgard | ................ | A62B 3/005 30/228 |
| 6,230,542 B1 * | 5/2001 | Frenken | ................ | B23D 23/00 30/228 |
| 6,244,568 B1 * | 6/2001 | Patton | .................... | A62B 3/005 254/93 H |
| 6,461,265 B1 * | 10/2002 | Graham | ................ | F16H 3/724 475/5 |
| 7,568,372 B1 * | 8/2009 | Patton | .................... | A62B 3/005 72/453.15 |
| 7,678,004 B2 * | 3/2010 | Yamanaka | ............ | B62D 5/008 475/339 |
| 9,194,480 B2 * | 11/2015 | Henkel | ................. | F16H 57/023 |
| 10,252,388 B2 * | 4/2019 | Takahashi | ................ | B23Q 5/56 |
| 2005/0199758 A1 * | 9/2005 | Ramun | .................. | A62B 3/005 241/266 |
| 2010/0307010 A1 * | 12/2010 | Patton | .................... | A62B 3/005 30/266 |
| 2011/0289998 A1 * | 12/2011 | Zhang | .................... | B23D 29/00 72/464 |
| 2014/0007433 A1 * | 1/2014 | Kochi | .................... | B26B 15/00 30/228 |
| 2014/0157522 A1 * | 6/2014 | Lorini | ................. | F16H 25/2252 7/107 |
| 2014/0260504 A1 * | 9/2014 | Hickerson | .............. | A62B 3/005 72/449 |
| 2015/0000491 A1 * | 1/2015 | Figiel | .................. | B65B 69/0025 83/385 |
| 2015/0121706 A1 * | 5/2015 | Zurcher | .................. | A01G 3/037 30/228 |
| 2015/0251256 A1 * | 9/2015 | Frenken | ................ | B25B 27/146 100/234 |
| 2015/0258598 A1 * | 9/2015 | Frenken | ................ | B21D 39/20 72/370.08 |
| 2015/0283714 A1 * | 10/2015 | Sandefur | ................. | B26B 15/00 30/210 |
| 2016/0039017 A1 * | 2/2016 | Lawlor | ............... | F16H 25/2252 30/228 |
| 2016/0252112 A1 * | 9/2016 | Kehoe | .................... | B23D 29/00 60/327 |
| 2019/0247937 A1 * | 8/2019 | Gall | ....................... | B23D 17/04 |

FOREIGN PATENT DOCUMENTS

| | | |
|---|---|---|
| WO | WO-2015025850 A1 | 2/2015 |
| WO | WO-2016077389 A1 | 5/2016 |

OTHER PUBLICATIONS

Wu, R., et al. "Basics of Mechanical Design" Beijing Institute of Technology Press, Jun. 2014, pp. 282-284 (English Translation of Table 16-2 provided), ISBN: 9787564093679.

CNIPA, First Office Action with English Translation, dated Nov. 21, 2019 re Chinese Patent Application No. 201680041305.4.

* cited by examiner

RESCUE TOOL

The present invention relates to a rescue tool comprising a drive system which is provided inside a housing and which is configured and suitable for actuating a linear displacement of an implement drive member, wherein the drive system is connected for axial rotation to a rotation shaft of an energizable drive source. The present invention also relates to a combination of a rescue tool and an exchangeable implement.

Such a tool is usually applied in emergency situations to release a victim by, depending on the tool used, spreading, cutting, lifting or stabilizing a trapping construction, for instance in the case a victim is trapped following an accident in which a vehicle is involved.

A rescue tool as referred to in the preamble is usually applied with a hydraulically driven cylinder-piston rod as drive system to bring about actuation of the implement. A linearly driven planetary roller the mechanism for this purpose is also known from patent application WO 2014145980. In this known device an axially rotatable spindle is enclosed by a rotatably driven planetary roller nut, wherein depending on the direction of rotation of the nut and inward or outward movement of the spindle is generated. This movement is converted by means of an implement drive member connected to the spindle to a cutting or spreading action of the rescue tool. It is important for such rescue tools that, not only can a sufficient force be developed by the implement, but also that the whole rescue tool remains sufficiently manageable that it can preferably be taken to and operated at the location of use by an individual rescue worker.

Although this latter known rescue tool obviates some disadvantages of hydraulically driven tools, it also has a number of drawbacks. In particular the transmission of the drive from the power source to the planetary roller nut arranged round the in and outward moving spindle requires a complex and relatively heavy mechanical construction, and moreover takes up a relatively large amount of space. This does not help in improving handling of the known rescue tool, particularly in emergency situations.

The present invention has for its object, among others, to provide a rescue tool which obviates the stated drawback.

In order to achieve the stated object a rescue tool according to the invention has the feature that the rotation shaft of the drive source is coupled for force transmission to an axially rotatable spindle, that the spindle is coupled rotatably to the housing by means of an axial bearing assembly, that a linearly movable drive body is coupled for force transmission to the spindle and is configured and suitable for converting an axial rotation of the spindle to a linear translation of the drive body, and that the drive body is coupled for force transmission to the implement drive member.

The linear displacement which can bring about an actuation of the implement via the implement drive member is applied here by the drive body, and not so much by the spindle itself as in the known tool. The drive body is actuated here via a force-transmitting coupling by the spindle, which is in turn driven by a drive source. Because the spindle is connected rotatably to the drive source and because the spindle does not displace relative to the drive source in translation direction, i.e. in the direction in which the drive member makes a movement, it is possible to suffice with a less complex and more compact construction in the coupling between drive source and spindle. Particularly the bearing-mounting of the spindle by means of the axial bearing assembly in the housing also makes an important contribution here to a reduction of the dimensions required for the tool. The rescue tool is hereby not compromised in respect of performance, but can however be given a more compact and lighter form. This increases manageability while the implement can be actuated with high force in order to provide an effective contribution toward the deployment of the rescue tool.

The rescue tool is provided with an energizable drive source, a rotation shaft of which performs a rotating movement. This rotation shaft is coupled for force transmission to the spindle. This force-transmitting coupling can be embodied, among other ways, as a direct mechanical coupling between drive source and spindle by means of a permanent fixed connection, or for instance by means of an indirect force-transmitting coupling via a gear transmission or other known transmission, such as a (parallel) gear transmission, a chain or a toothed belt transmission.

This can be a linear transmission, wherein the spindle lies substantially in line with the rotation shaft of the drive source, or at an angle by means of for instance a right-angle gear transmission, wherein the rotation shaft of the drive source is arranged substantially perpendicularly of the axial direction of the spindle.

When the implement is actuated by the implement drive member coupled to the drive body, forces are also fed back to the spindle via the drive body. Depending on the nature and deployment of the implement, these reaction forces can have a substantial effect on the suspension of the spindle. The spindle is suspended in the rescue tool such that a freedom of rotation of the spindle is retained under all conditions, while reaction forces fed back to the spindle are absorbed in axial direction of the spindle by the axial bearing assembly. These forces are absorbed or transmitted therein so that rotation freedom of the spindle does not suffer as a result.

The drive body is configured to convert an axial rotation of the spindle to a linear translation of its own. This means that the drive body is disposed movably in a translation direction substantially parallel to or the same as the direction in which the rotation shaft of the spindle extends. The drive body can optionally also have a freedom of movement in a rotation direction, for instance a rotation about the same rotation axis as the spindle.

A preferred embodiment of a rescue tool according to the present invention has the feature that the drive body comprises a planetary roller of a planetary roller-spindle mechanism, which planetary roller is suspended for axial rotation in rolling contact with the spindle and is arranged over the spindle. In this planetary roller spindle mechanism a rotation of the spindle is converted particularly efficiently and with little friction to a translation of the drive body. The at least one planetary roller is in rolling contact here with the spindle, wherein the rotation of the spindle is transmitted to the planetary roller which takes on a rotation about its own longitudinal axis. The planetary roller spindle mechanism preferably comprises a number of planetary rollers. These rollers preferably lie in a substantially rotation-symmetrical distribution around the spindle such that an active or reactive force in the translation direction of the tool is distributed equally thereover.

A further preferred embodiment of a rescue tool according to the present invention has the feature that the planetary roller and the spindle comprise mutually engaging contact means in the form of a screw thread, which screw thread runs helically and comprises a substantially right-angled apex angle. The screw thread can here comprise a single or multi-helical winding. In this embodiment matching screw threads are formed on the at least one planetary roller and on the spindle. The at least one planetary roller and spindle hereby engage each other in substantially clearance-free manner. The screw thread can be formed by means of a processing operation, such as milling, grinding or other machining technique. In an alternative embodiment the rescue tool comprises screw thread with a substantially trapezoidal cross-sectional profile, i.e. a trapezoidal profile when seen in a cross-sectional direction at right angles to the longitudinal direction of the screw thread.

A preferred embodiment of a rescue tool according to the present invention has the feature that the axial bearing assembly comprises a first bearing flange adjacent to the spindle and a second bearing flange, wherein rotatable bearing elements are received between the first bearing flange and the second bearing flange such that in operation axially transmitted forces from the spindle are absorbed. In contrast to the radial bearings known in the literature, which are mainly suitable for absorbing forces in radial direction of an arranged shaft, this embodiment is extremely suitable for absorbing forces in axial direction of the spindle while the freedom of rotation of the spindle is retained. Rotatable bearing elements are for this purpose received between said first and second bearing flanges. These bearing elements can have a spherical, cylindrical, tapering or other form.

In a preferred embodiment these bearing elements are formed cylindrically, wherein the individual rotation axes of the bearing elements lie in a direction at right angles to the axial direction of the spindle. The bearing elements are thus arranged such that a rotation direction is hereby followed around a rotation axis substantially at right angles to the rotation shaft of the spindle. The bearing flanges are preferably arranged substantially parallel relative to each other and substantially perpendicularly of the axial direction of the spindle.

A further preferred embodiment of a rescue tool according to the present invention has the feature that the axial bearing assembly comprises a third bearing flange, wherein rotatable bearing elements are received between the second bearing flange and the third bearing flange, wherein the third bearing flange is placed substantially parallel relative to the second bearing flange. Because of this axial bearing in dual form axial loads can be readily absorbed, particularly in cases where the load on the supported rotation shaft of the spindle is exerted from two sides. In an embodiment the form of the bearing elements between the second and third bearing flange can be substantially the same as that of the bearing elements between the first and second bearing flange, or differ therefrom.

A further preferred embodiment of a rescue tool according to the present invention has the feature that the spindle is connected rotatably to a radial bearing for the purpose of absorbing forces transmitted radially onto the rotation shaft. Arranged for this purpose in an embodiment is a radial slide bearing for absorbing radially directed forces acting on the rotation shaft of the spindle. In a preferred embodiment the radial bearing comprises a radial needle bearing. Substantially radially directed forces can hereby also be absorbed as well as the axially transmitted forces on the spindle. In co-action with the axial bearing assembly forces can thus be absorbed with a component in both axial and radial transmission direction.

A further preferred embodiment of a rescue tool according to the present invention has the feature that the radial needle bearing has a first zone in which the needle bearing is in rolling contact with the spindle and has a second zone in which the needle bearing can bend outward in radial direction. The bearing assembly is provided for this purpose adjacently in the housing with a deflection cavity in which the needle bearing has freedom of movement to bend outward in the second zone, while in the first zone the needle bearing remains in rolling contact with the spindle.

A rescue tool according to the present invention comprises an energizable drive source. This drive source is switchable such that a rotation is applied to the output rotation shaft when the drive source is switched on. This drive source can comprise a movement converter on for instance mechanical, electromechanical or chemical-mechanical principle, such as for instance a manual handle, electric motor or combustion engine respectively. This drive source can comprise an internal or external transmission. A preferred embodiment of a rescue tool according to the present invention has the feature that the energizable drive source comprises an electrically energizable motor.

This electrically energizable motor applies a rotation in per se known manner to the output shaft by means of electromagnetic actuation. A rotation shaft can be driven almost instantaneously by means of a switched electric motor. The controllability of the drive can hereby be configured in relatively simple manner. In addition to the controllability of the switching on and off, an electric motor is also highly suitable for generating a variable output speed to the output rotation shaft of the electric motor, and thereby a variable speed of the implement on the rescue tool. This increases the measure of control over the rescue tool, which can be of great importance for freeing a victim in controlled manner, particularly in emergency situations.

A further preferred embodiment of a rescue tool according to the present invention has the feature that the drive source comprises an electrically energizable motor, and that an electric power supply for the motor is provided in or on the housing. In an embodiment this power supply is provided permanently inside the housing as a fixedly connected battery or an assembly of a number of batteries. The power supply of one or more batteries is in that case rechargeable via a cable to the device. In another embodiment the power supply is provided as power supply module manually releasable from the housing. Such a power supply module is configured and suitable to be received in or on the rescue tool for the purpose of generating an electric power supply to the electric motor, and can also be accommodated in a charging station for recharging of the power supply module.

A preferred embodiment of a rescue tool according to the present invention has the feature that the rotation shaft of the drive source is coupled for force transmission to the spindle via a mechanical reduction transmission. By means of such a mechanical reduction transmission, such as a gear transmission with a transmission ratio from input to output, i.e. from drive source to spindle in a transmission ratio greater than one, a number of rotations made by the output rotation shaft of the drive source per full rotation of the spindle will be greater than one. In addition to having the effect of reducing the number of rotations, this mechanical reduction transmission also has the effect that the torque force on the driven side of the spindle is greater than the torque force on the driving side of the motor. This increase in torque force has the effect that, using a relatively small drive source, a high output force can be generated on the side of the rescue tool where the rescue tool is loaded.

A further preferred embodiment of a rescue tool according to the present invention has the feature that the mechanical reduction transmission comprises at least one planet wheel mechanism, wherein a driven gear wheel in a reduction transmission engages on at least one planet gear arranged therearound. In view of the relatively high load forces with which the implement is driven it is advantageous to carry out transmission of the drive forces from the drive source to the implement as symmetrically as possible. A mechanical reduction transmission having a planet gear arranged therearound, preferably a number of planet gears, particularly in substantially symmetrical distribution around the drive shaft, results in an advantageous distribution of transmitted forces. In addition, this arrangement of the mechanical reduction transmission can be given a compact form, this enhancing the manageability of the rescue tool.

In a further preferred embodiment according to the present invention the mechanical reduction transmission is coupled rotatably to the axial bearing assembly. A highly compact construction is obtained due to such a rotatable coupling of the part of the mechanical transmission adjacent to the axial bearing assembly. In an embodiment at least one of the planet gears is coupled rotatably to the axial bearing.

A preferred embodiment of a rescue tool according to the present invention has the feature that a mechanical braking device is provided between spindle and energizable drive source which can be actuated in order to counteract a rotation of the spindle. Depending to greater or lesser extent on the implement used, it is important that the rescue tool, after a partial actuation, can be fixed in the orientation and/or position which the implement has taken up at that moment. Provided for this purpose is a mechanical braking device which can for instance be activated by means of a control on the outer side of the rescue tool. In an embodiment this braking device comprises a drum brake with friction elements which, upon activation of the braking device, are pressed against a movable part so as to thus prevent a change in orientation of this part. In another embodiment the braking device comprises an electromechanical brake which is integrated into the drive source and which, by means of an appropriate control of the electromagnetic elements, can prevent a rotation of the output shaft of the drive source.

In a preferred embodiment the control of the mechanical braking device and the control of the drive source are coupled to each other, for instance by means of a rotatable handgrip. When this handgrip is operated the drive source is activated and the mechanical braking device is unlocked, i.e. brought into a nonbraking position, by means of a rotation of a rotatably disposed part of the handgrip. When the handgrip is released, this part can be forced back again to a starting situation, for instance by means of a spring. The drive source is then no longer actuated and the braking device is then also returned to a braking mode.

A preferred embodiment of a rescue tool according to the present invention has the feature that a mechanical braking device, which can be actuated in order to counteract a rotation of the spindle, is provided between the mechanical reduction transmission and drive source. It is advantageous to provide the mechanical braking device between the mechanical reduction transmission and the drive source because the drive torque will be relatively low here and a small braking action will thus suffice here to fix the drive system. Owing to the mechanical reduction transmission a relatively small braking force will be transmitted in enhanced manner to the side of the spindle with a factor having the magnitude of the transmission ratio of the transmission. It is hereby possible to suffice with a relatively compact mechanical braking device in order to nevertheless brake a relatively great load.

A preferred embodiment of a rescue tool according to the present invention has the feature that a clutch is provided between the drive source and the spindle. This clutch can for instance take the form of a slip clutch or a fixed clutch. Using a clutch in the drive line between drive source and spindle can ensure that the drive source can come into operation before the drive source couples in force-transmitting manner to the spindle and is loaded.

A further preferred embodiment of a rescue tool according to the present invention has the feature that the clutch is an fixed clutch and is coupled on the one hand for force transmission to the output shaft of the mechanical reduction transmission and is coupled on the other for force transmission to the spindle, and wherein the fixed clutch is embodied such that in operation the rotation shaft of the drive source makes several rotations before the spindle is driven in force-transmitting manner.

In an embodiment a substantially star-shaped cam member is coupled for force transmission here to the output shaft of the mechanical reduction transmission. Provided in the opposite bearing flange of the axial bearing assembly to which the spindle is connected is a substantially star-shaped recess for receiving the cam member. This recess is larger in tangential direction than a size of the cam member so as to ensure that the drive source makes several rotations before the cam member moves against a wall of the recess whereby a force-transmitting coupling between drive source and spindle is brought about.

A preferred embodiment of a rescue tool according to the present invention has the feature that a hollow drive rod is provided which extends on a first side in force-transmitting manner from the drive body and is coupled, or at least can be coupled, on the second opposite side in force-transmitting manner to the implement drive member, wherein the drive rod and the drive body lie coaxially round the spindle and at least substantially fully enclose the spindle in a retracted position of the drive rod. This concentric construction telescoping into itself results in a strong and compact embodiment of the rescue tool.

With an eye to an ergonomic and effective utilization of a rescue tool continuous efforts are made to reduce the dimensions thereof while retaining strength and performance. In addition to the cross-section of the tool, the total length of the tool is also an important factor here. With a view to shortening the required working length of the tool a further preferred embodiment of the tool according to the invention has the feature that the spindle is received inside a hollow chamber and the drive rod moves outside the chamber via a close-fitting exit opening, wherein a stop comes up against an edge of the opening in an extreme position of the drive rod, wherein the stop is provided on a side of the drive body remote from the exit opening and the drive body likewise moves at least partially outside the exit opening in the extreme position of the drive rod.

This embodiment makes use here of a drive body with an active cross-section which is at most equal to that of the drive rod itself so that they can together move outside the exit opening. In addition to using a length of the drive rod itself, a length, or at least a part of a length, of the drive body can thus also be utilized for the displacement imparted to the implement drive member. This results in a significant reduction in the overall length required for the tool, and thereby in a more compact construction thereof.

An embodiment of a rescue tool according to the present invention has the feature that an implement is coupled in fixedly mechanical manner to the implement drive member. The rescue tool is embodied here with a fixedly connected implement. The coupling to the implement can then be dimensioned specifically for this implement, whereby a powerful, compact and efficient coupling results. The implement is here connected non-releasably, or at least substantially neither configured nor intended to be exchangeable, to the implement drive member.

A particular embodiment of a rescue tool according to the present invention has the feature that the implement comprises at least one of shears, a spreader and ram. The linearly movable actuation as generated by the rescue tool can be utilized very effectively for a cutting movement via a shear implement. A deformed construction of a vehicle can for instance be hereby cut away in the case someone is trapped. The actuation can also be utilized very effectively for a spreading operation, wherein two or more arms of a spreader can for instance enlarge an opening in a deformed construction, or can move apart two elements lying against each other in order to create an enlarged passage. The present invention can also be used very effectively in a ram implement, with which a strut is formed. A substantially cylindrical element is extended with force here in order to thus support or move an element or structural part.

In a further preferred embodiment of the tool comprises a ram or strut implement and the tool is provided with a substantially right-angled transmission from the drive source to the spindle such that the drive source and the control thereof lie outside the line of the movement to be actuated. Both outer ends of the rescue tool can thus be moved apart with force, while the control remains accessible and can be operated during the entire operation. Alternatively, only the control of the tool can be arranged at right angles to the longitudinal direction of the spindle while the drive source is arranged in the line of the movement to be actuated. In this embodiment the control also remains accessible and controllable during the entire operation, while both outer ends can be moved apart with force in longitudinal direction of the rescue tool provided with a ram implement.

The present invention also relates to a combination of a rescue tool and an exchangeable implement. A preferred embodiment of a rescue tool according to the present invention then has the feature that a quick-connect mechanism is provided such that an implement can be exchangeably arranged and, when it is arranged, a force-transmitting coupling results between the implement and the implement drive member. By providing the rescue tool with a quick-connect mechanism wherein an implement can be arranged in exchangeable manner a single basic module of the tool in which the linear actuation is provided can be coupled to diverse implements for arranging thereon, such as for instance shears or a spreader. A single basic module can hereby be taken along in the case of a journey to an emergency situation, while the implement can be adapted to the situation encountered. This has on the one hand a favourable space-saving effect, while on the other the utilization of the actual implement can be decided on site, thereby retaining flexibility of deployment.

A preferred embodiment of an implement according to the present invention has the feature that the implement is suitable and configured to be arranged exchangeably in a rescue tool. Coupling elements can for this purpose be provided on the implement which enter into co-action with coupling elements of the rescue tool engaging thereon. In an embodiment the implement is connectable to the housing of the rescue tool by means of a screw connection. In another embodiment a bayonet connector is provided, whereby an implement can be easily exchanged.

The invention will now be further elucidated on the basis of a number of exemplary embodiments and an associated drawing. In the drawing.

The figures are of purely schematic nature and not all drawn to scale. Some dimensions in particular are exaggerated to greater or lesser extent for the sake of clarity. Corresponding parts are designated as far as possible in the figures with the same reference numeral.

Figure 1:
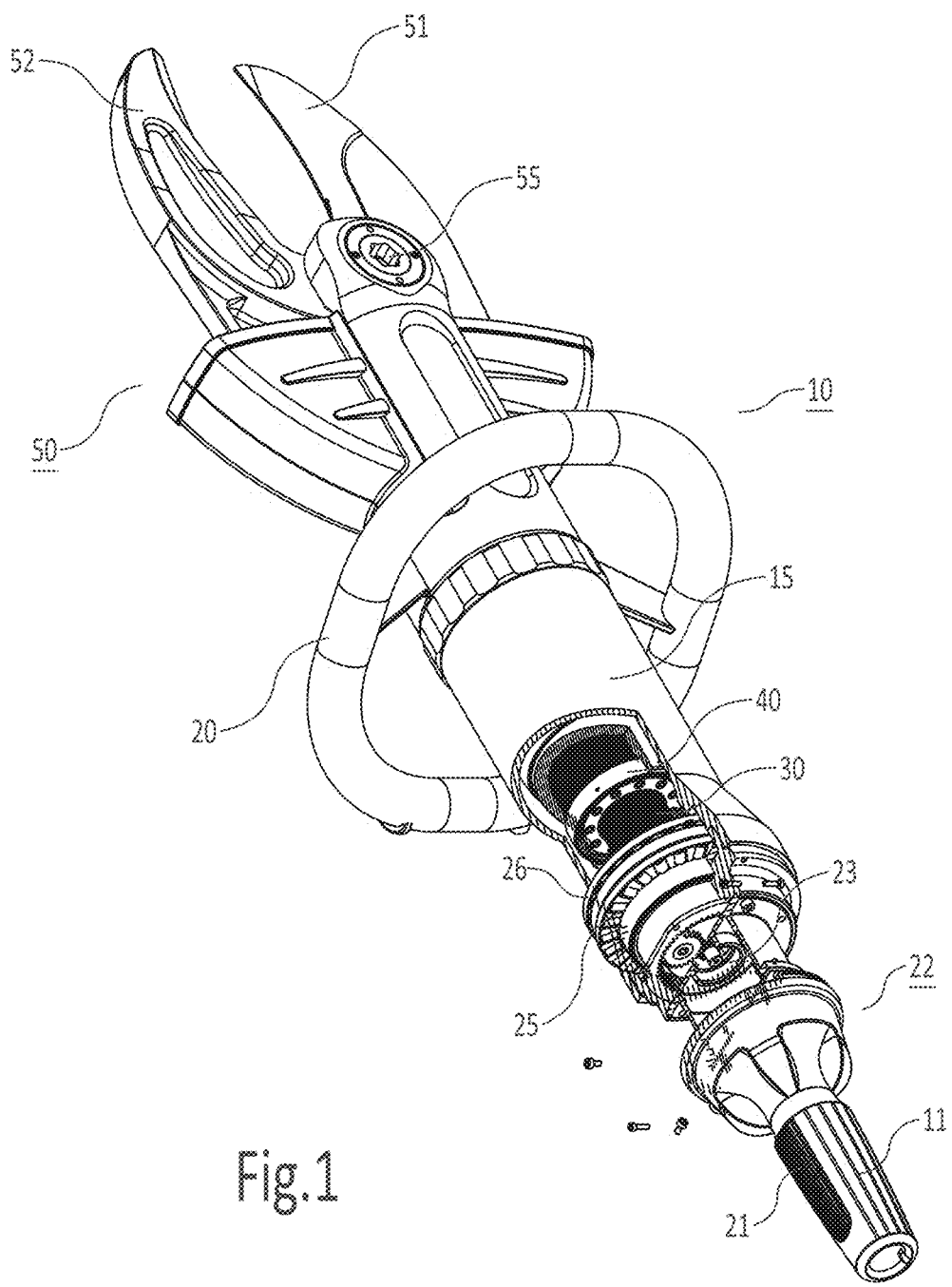
FIG. 1 shows a partially cut-away perspective impression of an exemplary embodiment of a rescue tool according to the invention provided with a shear implement.

FIG. 1 shows an exemplary embodiment of a rescue tool according to the invention, wherein a shear implement 50 with shear blades 51, 52 extend from rescue tool 10. Rescue tool 10 comprises a housing 15 for a watertight covering of the internal components of the rescue tool and also for mechanical protection of moving parts. A user can manipulate front handgrip 20 with one hand while rear handgrip 11 can be actuated with another hand, which may or may not be of the same person. Rear handgrip 11 is provided with a rotatable operating handle 21 with which, during handling of rescue tool 10, the user can switch the tool on and off as well as make it run faster or slower with a corresponding rotation of the handgrip.

Figure 2A:
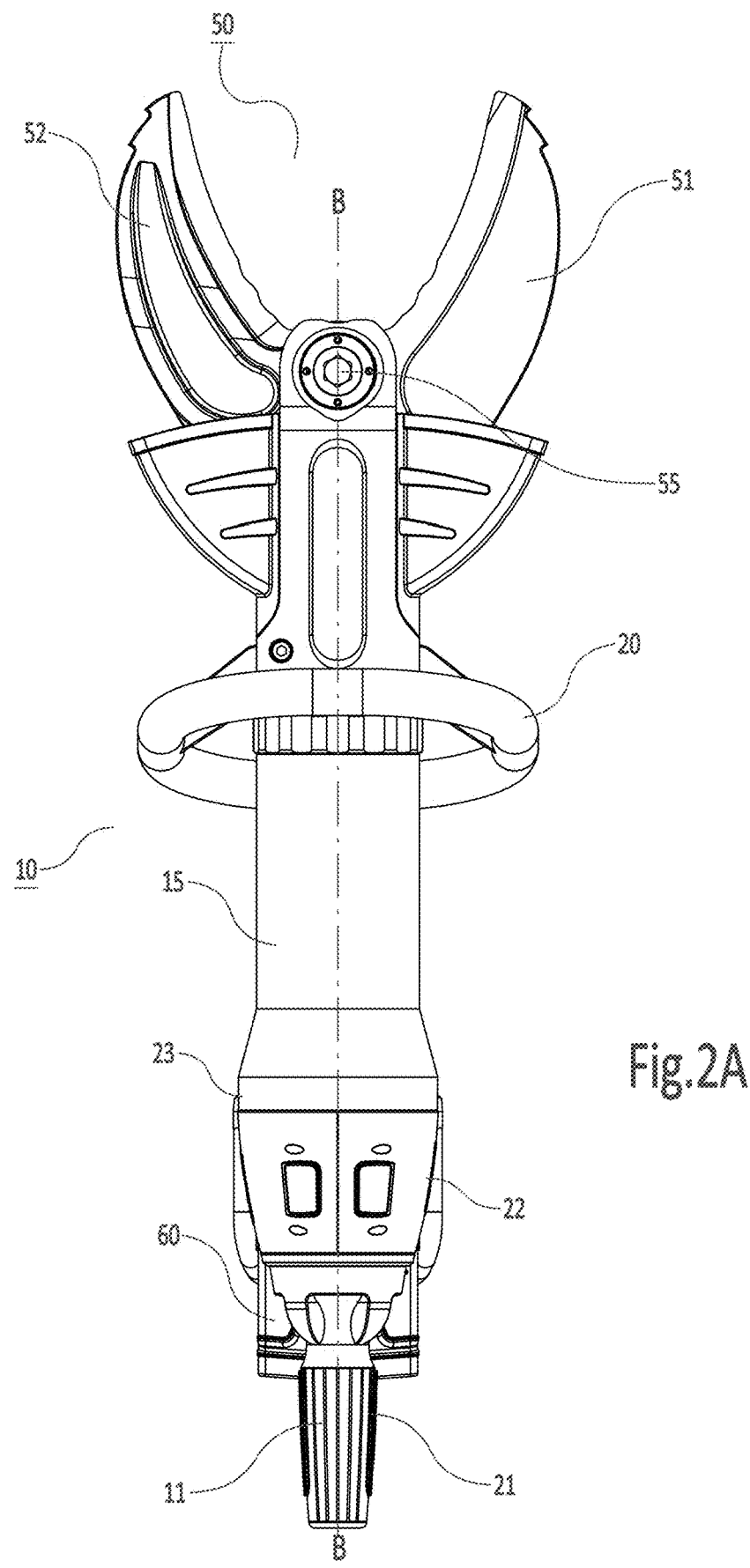
FIG. 2A shows a side view of the rescue tool of FIG. 1.
Figure 2B:
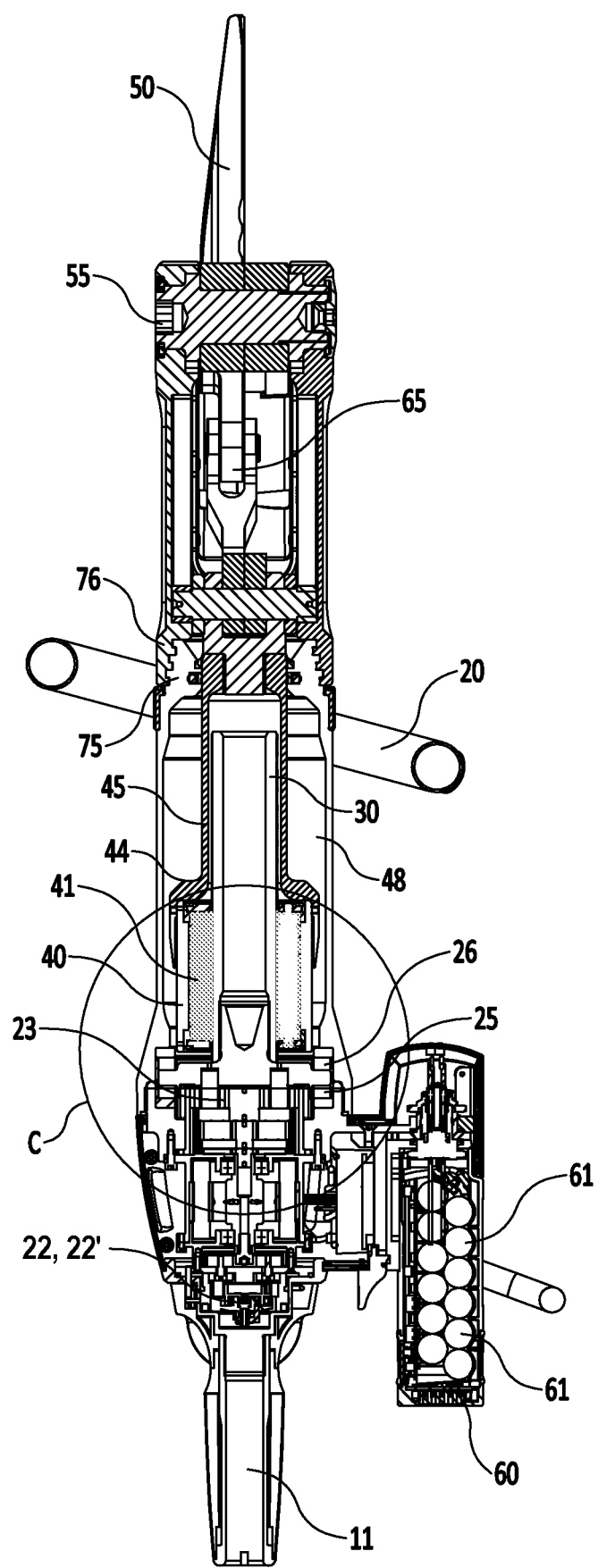
FIG. 2B shows a cross-section of the rescue tool of FIG. 1 along the line B-B shown in FIG. 2A.

Rescue tool 10 is provided with drive source 22 in the form of an electric motor which is powered by an exchangeable rechargeable battery pack 60 which serves as power supply to both the electric motor and electronics present in the tool, see also FIG. 2B. Drive source 22 comprises an actuated output rotation shaft which drives a first gear wheel in the mechanical reduction transmission 23. A spindle 30 is driven by means of the mechanical reduction transmission 23. This spindle 30 is suspended in housing 15 by means of an axial bearing assembly for facilitating the rotation of spindle 30 and also for absorbing axially transmitted forces.

The axial bearing assembly comprises a first axial bearing 25 and a second axial bearing 26 coupled thereto. Lying over spindle 30 is a linearly movable drive body 40, from which extends a hollow, substantially cylindrical drive rod 45. Drive rod 45 and the drive body enclose spindle 30 in concentric manner, whereby the spindle lies at least substantially wholly inside drive rod 45 in a fully retracted state of the drive rod. Drive rod 45 is connected at a distal end to an implement drive member to which shear blades 51, 52 of shear implement 50 are coupled.

An outward linear movement of drive body 40 in the direction of implement 50 results in shear blades 51, 52 moving toward each other. An inward linear movement of the drive body over spindle 30 conversely results in shear blades 51, 52 spreading apart. The shear blades rotate here around a rotation shaft of a rotation spindle 55. This rotation spindle also has a structural function of holding together the shear blades connected to the implement. In this exemplary embodiment implement 50 is connected fixedly to the rescue tool, i.e. not configured and intended to be exchangeable by an end user.

In another exemplary embodiment the implement can take an exchangeable form. This does not however change the operating principle of the drive of the tool. The drive rod is then connected releasably, and thereby exchangeably, to the implement drive member. The implement can then be uncoupled from housing 15 by means of a releasable rapid-action coupling and exchanged. Inside the implement a receiving member connected to the implement drive member is coupled for transmission of mechanical force to the connecting elements which are connected to shear blades 51, 52, whereby a linear movement of drive body 40 will be transmitted thereto.

Serving as power supply to power source 22 of the tool and to the other electronics is a rechargeable battery pack 60 as shown in FIG. 2B. Received inside this battery pack 60 is a series of rechargeable battery cells or batteries 61. In this exemplary embodiment battery pack 60 is arranged exchangeably in rescue tool 10 such that the battery pack can be detached in order to be charged on an external charger (not shown), and a fully charged battery pack can be coupled to the tool as soon as it has to be deployed.

Drive body 40 encloses rotatable screw spindle 30 and comprises several planetary rollers 41 which are arranged round screw spindle 30 in rolling contact therewith and which form part of a so-called planetary roller nut. By means of engaging means on planetary rollers 41 in co-action with a helical screw thread arranged on screw spindle 30 a rotation of spindle 30 will be converted to an axial rotation of planetary rollers 41 which, because of the helical form of screw spindle 30, will be urged here into a linear displacement. Planetary rollers 41 are enclosed on two sides by flanges in which the planetary rollers are rotatably suspended. Arranged on planetary rollers 41 is a toothing which also engages in a toothing engaging herein on the inner side of the housing of drive body 40. A so-called planetary roller nut is hereby formed around the axially rotatable screw spindle 30 in a planetary roller-spindle mechanism.

Figure 2D:
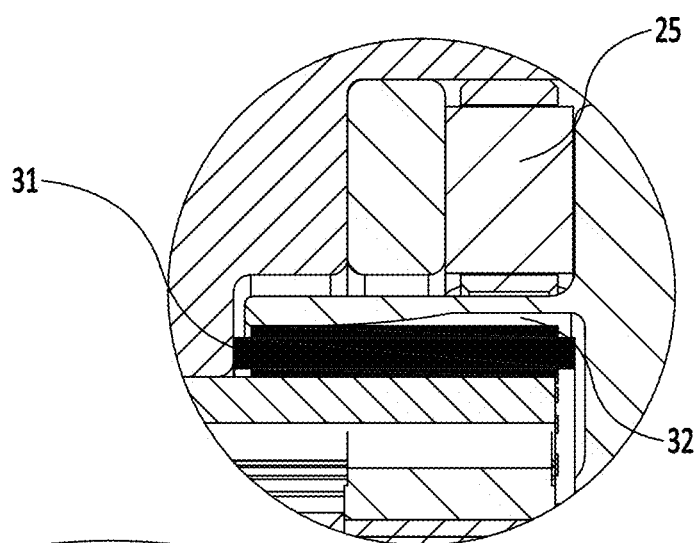
FIG. 2D shows a further detail view of the area D circled in FIG. 2C.
Figure 2C:
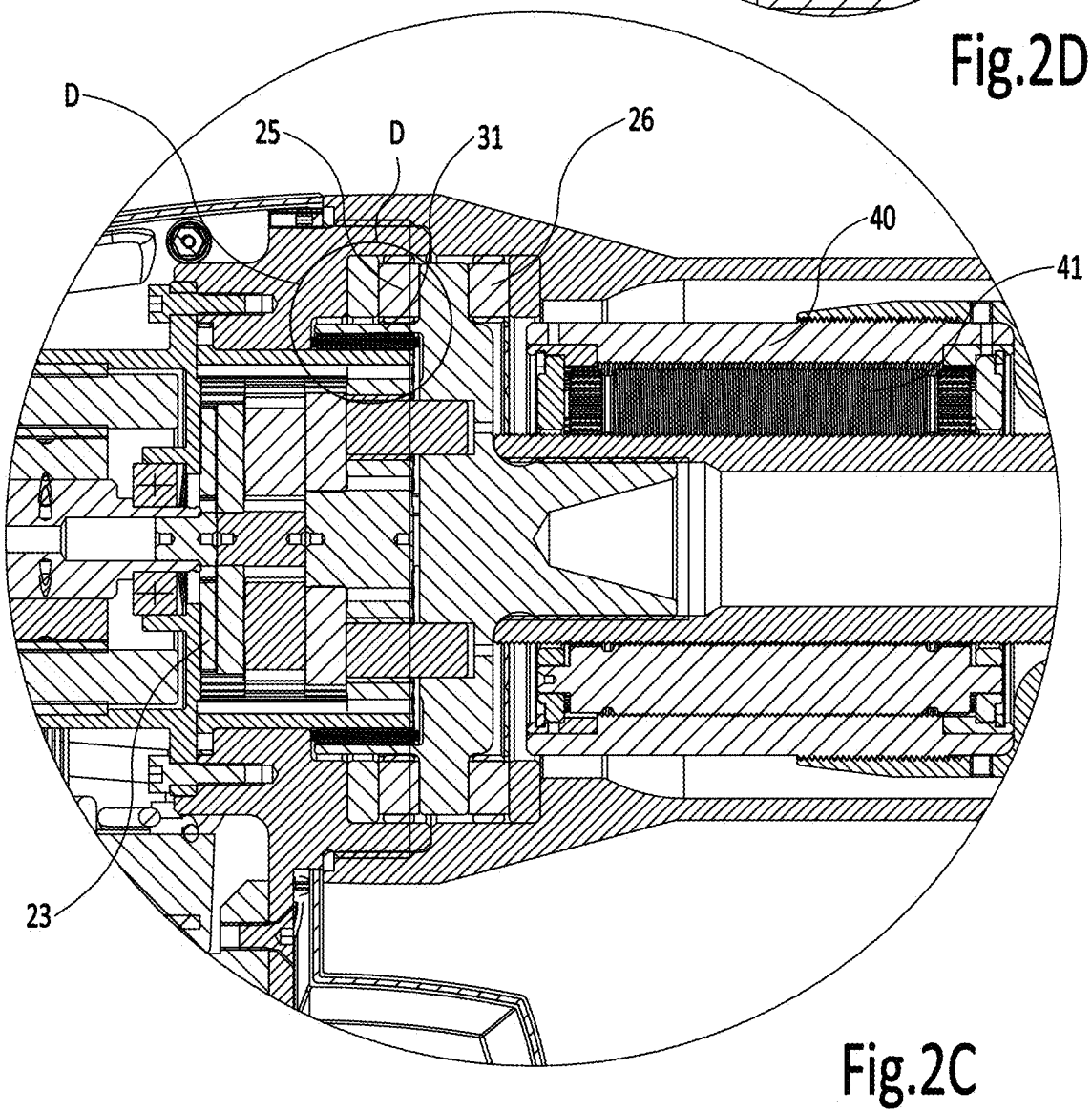
FIG. 2C shows a detail view of the area C circled in FIG. 2B.

As shown in the enlarged detail view of FIG. 2C, a final stage of the planet gear transmission of the mechanical reduction transmission 23 is connected on the side of spindle 30 to the bearing flange of the axial bearing 25 adjacent thereto, and needle bearings 31 are also arranged for the purpose of absorbing radial loads. The outgoing driven shaft of the mechanical reduction transmission 23 is connected to spindle 30. An implement is easy to exchange by means of the coupling means in exchangeable form between rescue tool and implement.

FIG. 2D shows a further detail view of the area D designated in FIG. 2C, more specifically a detail of needle bearing 31. Arranged for the purpose of absorbing radially directed forces is a needle bearing 31 comprising a number of needle elements for bearing-mounting of the spindle relative to the bearing flanges which are connected to axial bearings 25, 26. Under load of the tool it is possible that the bearing flanges will exhibit bending. In order to be able to accommodate this bending and not allow it to affect the radial bearing, needle elements are provided which comprise a first zone in which the needle elements are in rolling enclosed contact with the bearing-mounted elements, and comprise a second zone with a gap 32 adjacent thereto in which needle element 31 can bend elastically if the bearing flanges bend.

Figure 3A:
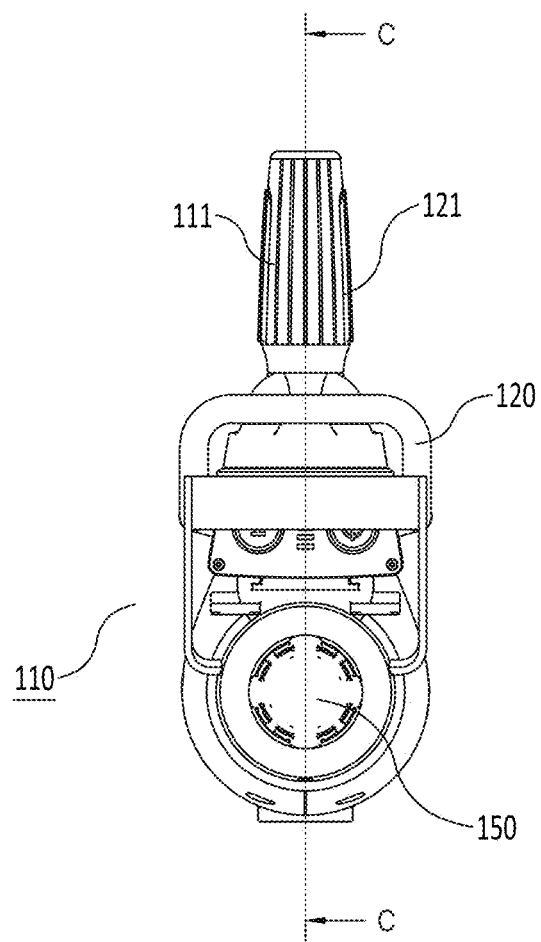
FIG. 3A shows a front view of an exemplary embodiment of a rescue tool provided with a ram implement according to the invention.
Figure 3B:
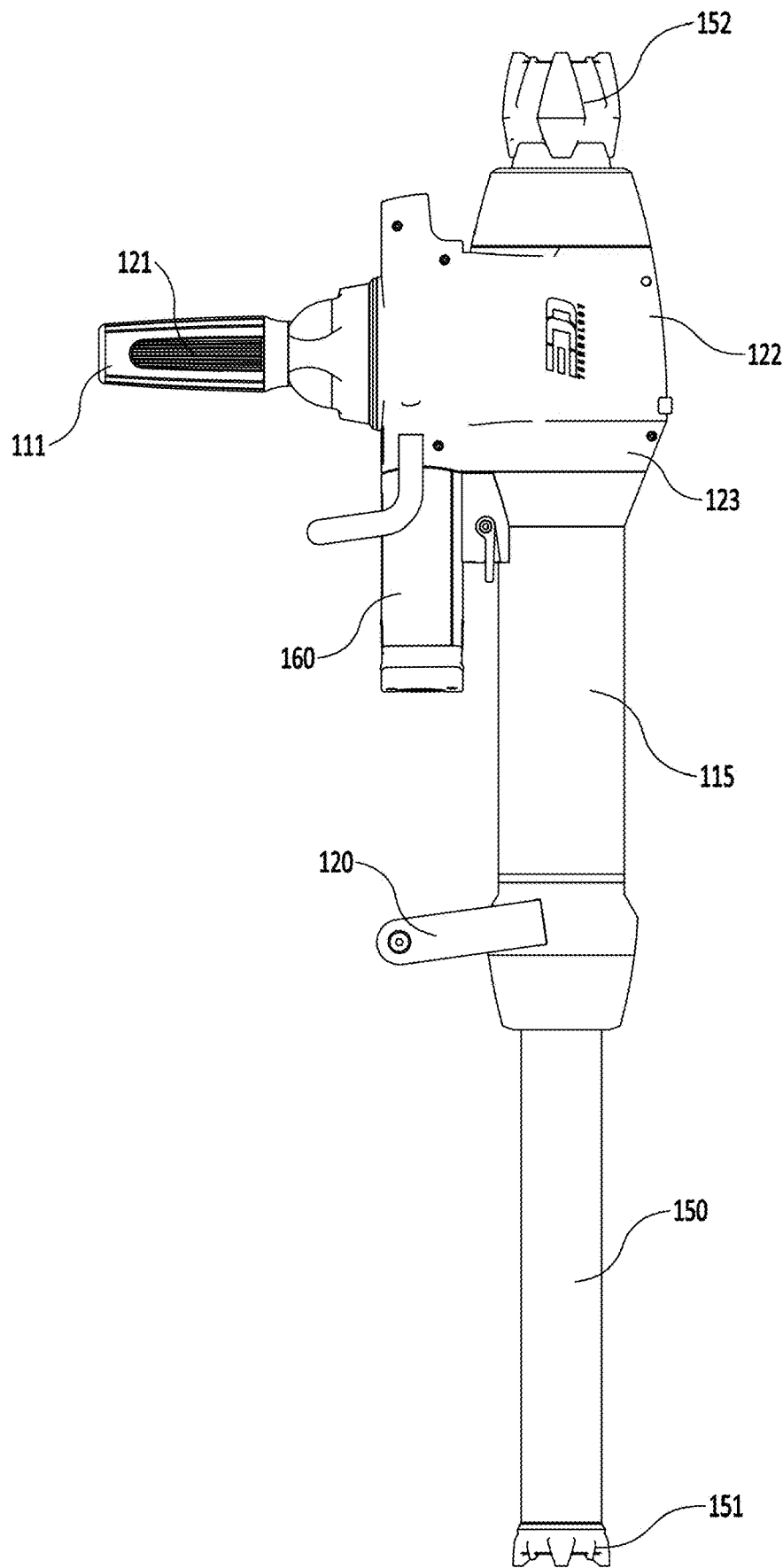
FIG. 3B shows a side view of the rescue tool of FIG. 3A.

FIG. 3A shows a front view of an exemplary embodiment of a rescue tool provided with a ram implement 110 according to the invention. Since this resulting ram exerts a force at both front and rear, handgrip 111 and control 121 are placed at right angles to the longitudinal direction. The foremost handgrip 120 on housing 115 can be used by a user to position the implement accurately before switching on the rescue tool with control 121. After the operation the rescue tool, optionally in retracted state, can once again be picked up by means of the foremost handgrip 120.

In the shown exemplary embodiment the rescue tool is provided with a non-movable rear ram part 152. Via reduction transmission 123 electric motor 122 drives screw spindle 130 which is received in an axial bearing assembly consisting of two axial bearings 125, 126. Opted for in this exemplary embodiment is to place electric motor 122 as drive source in line with the longitudinal axis of spindle 130. Opted for in another exemplary embodiment (not shown) is a right-angled placing wherein the drive source is arranged in line with rear handgrip 111 and transmits a rotation to the screw spindle via a right-angled transmission.

The ram is provided with a power supply 160 which is arranged non-releasably and comprises a number of battery cells 161. The rechargeable battery cells are charged by means of an external charging station (not shown) which can be connected to the battery cells via a conductive cable with connector. In another embodiment (not shown) this power supply is arranged in exchangeable manner, similarly to the embodiment described above and shown in FIGS. 2A-D.

Figure 3C:
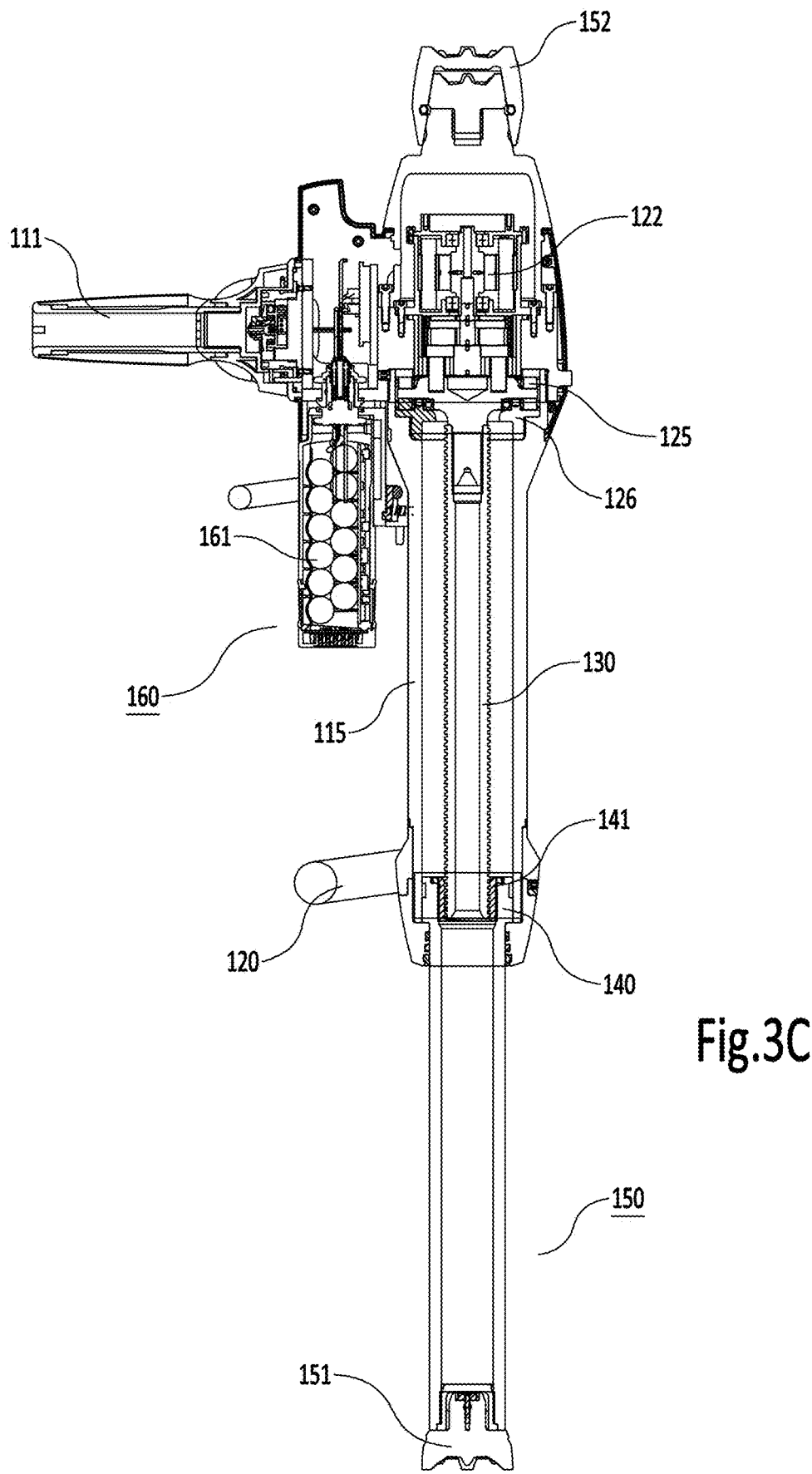
FIG. 3C shows a cross-section of the rescue tool of FIG. 3A along the line C-C shown in FIG. 3A.

Drive body 140 is shown in cross-section in FIG. 3C in an extreme position, whereby ram implement 150 has assumed a fully extended orientation. By moving front ram part 151 and rear ram part 152 apart under pressure from the drive body a construction can be stabilized, or two construction parts can be pushed apart in order to create a passage.

The embodiment shown in FIGS. 3A-D comprises an axially rotatable spindle having arranged thereon a trapezoidal screw thread in multiple helix form. This screw thread interacts with a fixed nut, i.e. a linearly movable drive body configured to receive the trapezoidal screw thread of the spindle. Planetary rollers are not provided in this embodiment, and the rotation of the spindle is converted directly by the fixed nut to a linear translation of the drive body. The tool can hereby withstand a higher load, this with a view to the use thereof as supporting strut or ram under a heavy construction. Also provided is a drum brake mechanism (not further shown) which prevents the ram parts of the ram implement moving back toward each other in undesired manner under pressure of external load. This brake is actuated by means of rotating the rear handgrip.

Figure 4A:
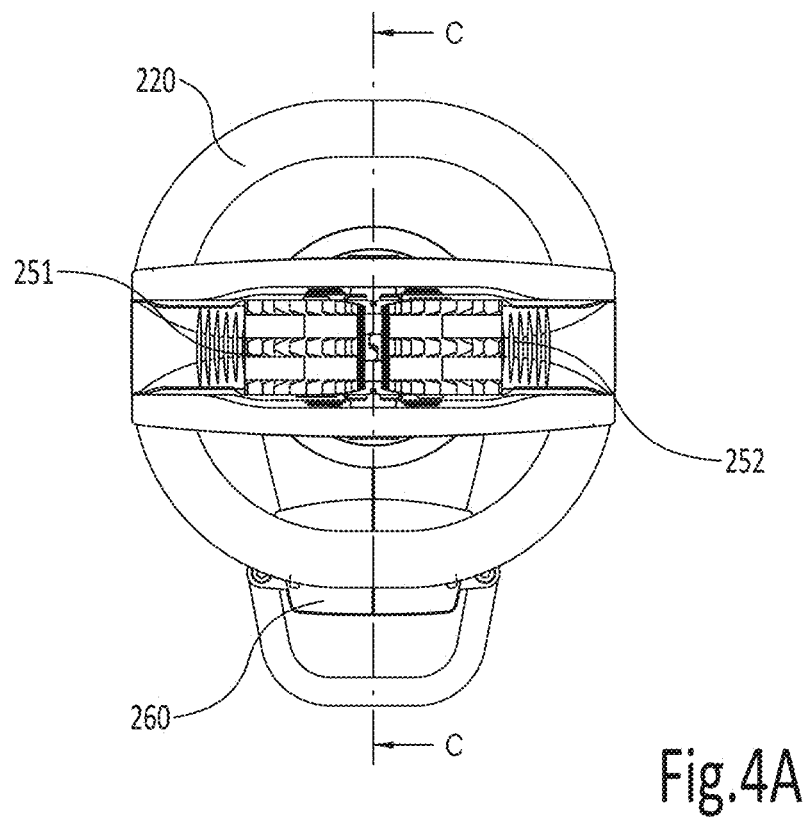
FIG. 4A shows a front view of an exemplary embodiment of a rescue tool provided with an exchangeable spreader implement according to the invention.
Figure 4D:
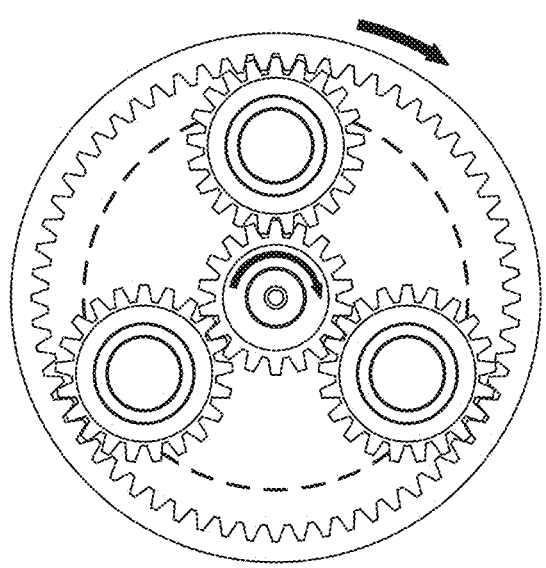
FIG. 4D shows a schematic view of a variable transmission in which each of the motors has a different transmission ratio relative to the spindle.
Figure 4B:
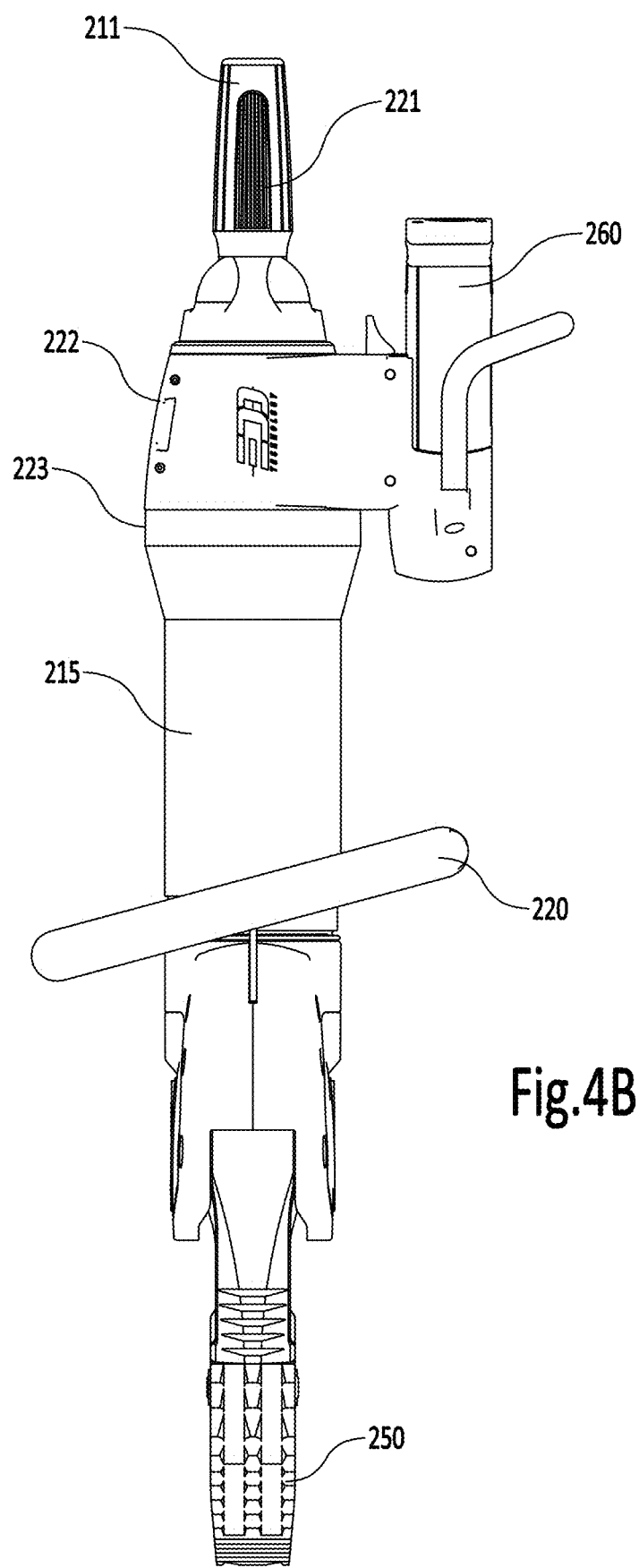
FIG. 4B shows a side view of the rescue tool of FIG. 4A.
Figure 4C:
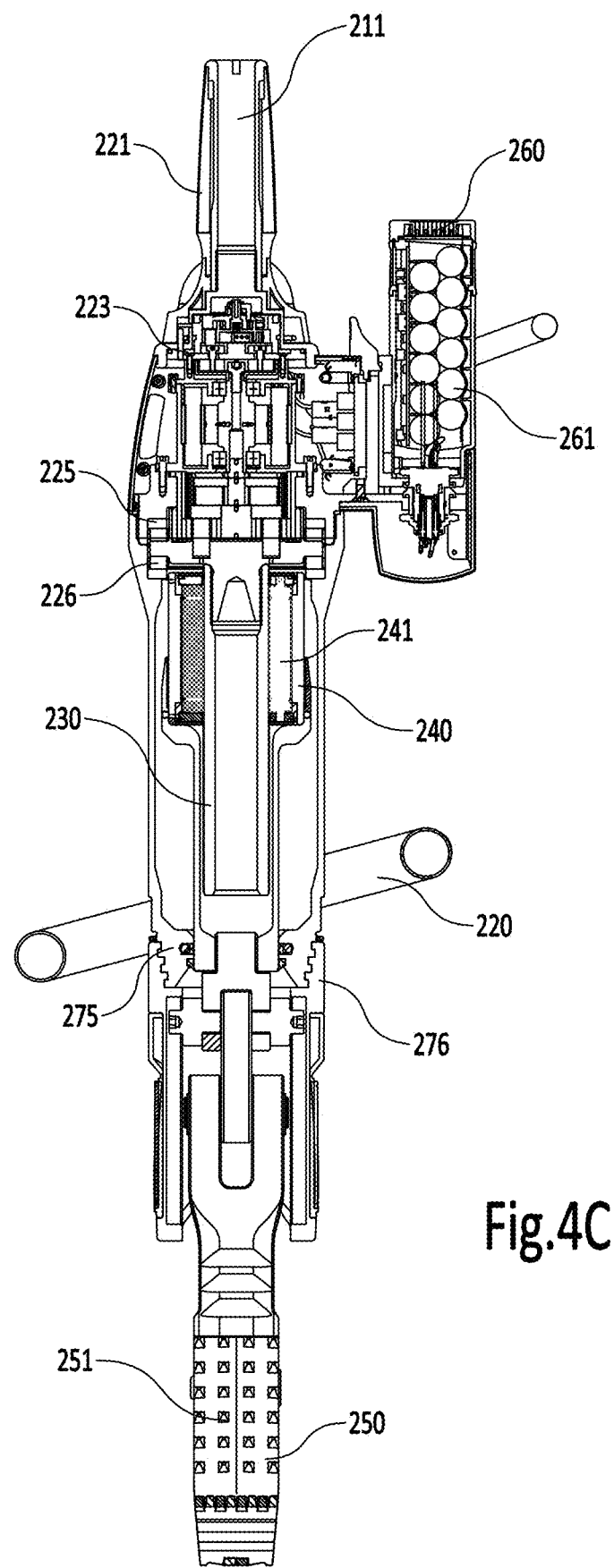
FIG. 4C shows a cross-section of the rescue tool of FIG. 4A along the line C-C shown in FIG. 4A.

Shown in FIGS. 4A-C is an exemplary embodiment of a rescue tool according to the invention which is provided with a spreader implement 250 arranged exchangeably thereon. This spreader implement 250 comprises a first spreader arm 251 and second spreader arm 252 which can be actuated by means of the linear drive so as to move apart for the purpose of spreading a construction in order to obtain a better access during a rescue operation. It will be apparent that a reverse movement of drive body 240 provided with planetary rollers 241 by means of reversing the rotation direction of electric motor 223 will result in a movement of spreaders 250 toward each other.

Control 221 is provided on rear handgrip 211 with which the mechanical braking device can also be operated by rotating the handgrip 211. Screw spindle 230 is suspended rotatably in an axial bearing assembly provided with axial bearings 225, 226. In cross-section as shown in FIG. 4C the drive body is shown in an extreme retracted position, whereby spreader 250 has assumed a closed orientation and spreader arms 251, 252 lie against each other. Spreader arms 251, 252 are provided with toothings on the outer side such that an object encounters sufficient resistance during the operation of moving the spreader apart. Spreader implement 250 and the rescue tool are provided with elements 275 and 276 for exchangeable accommodation of the implement in the rescue tool.

Figure 5B:
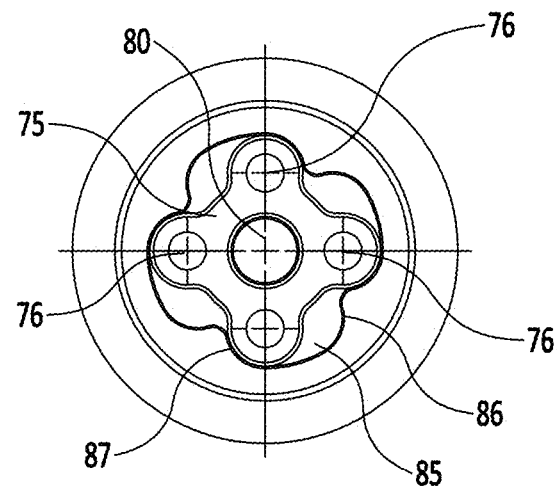
FIG. 5B shows a cross-section of a rescue tool according to the invention along the line B-B shown in FIG. 5A.
Figure 5A:
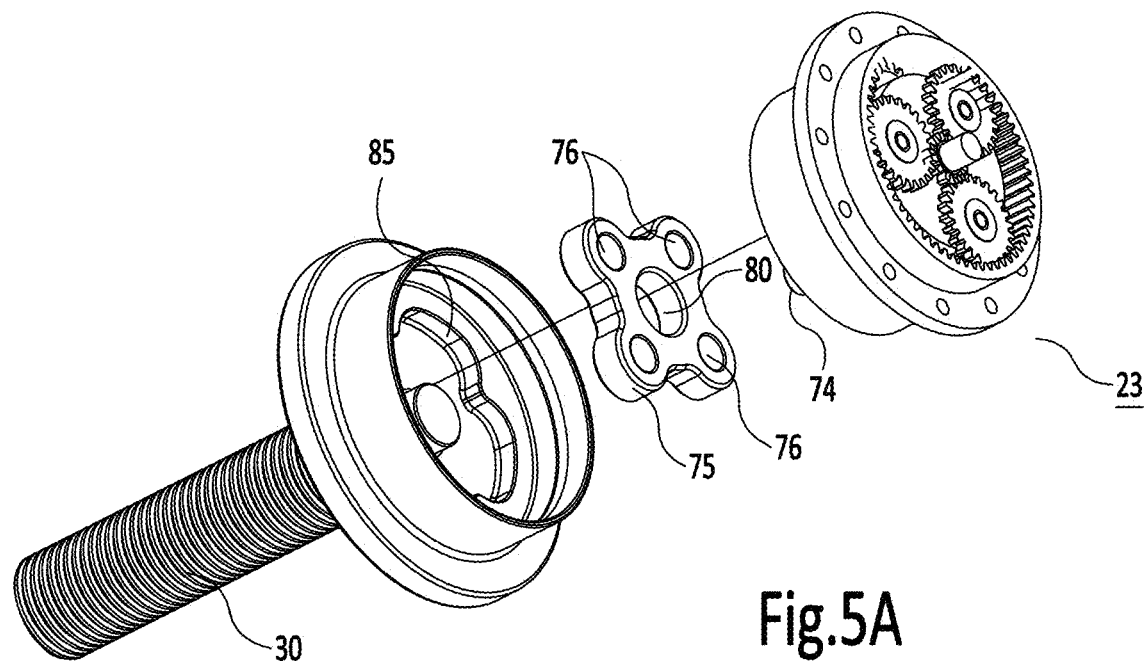
FIG. 5A shows a schematic perspective exploded view of an fixed clutch between the mechanical reduction transmission and the spindle driven thereby in an exemplary embodiment of a rescue tool according to the invention.

FIG. 5A shows a schematic perspective exploded view of a part of an fixed clutch between the mechanical reduction transmission and the spindle driven thereby. This clutch can be applied in each of the above described exemplary embodiments of a rescue tool according to the invention. In the shown part of mechanical transmission 23 an output shaft of the transmission is coupled to star-shaped cam member 75. Provided in this embodiment are four cams, although in alternative embodiments (not shown) a cam member can also be provided with a different number of cams. Located in the cams are connecting holes 76 for receiving connecting pins 74 with which the output shaft of the mechanical reduction transmission is coupled for force transmission to cam member 75.

Provided in the opposite bearing flange of the axial bearing assembly to which spindle 30 is connected is a substantially star-shaped recess 85 for receiving cam member 75. This recess is larger than necessary in tangential direction for the size of the cam member in order to thus allow the drive source to make several rotations before the cam member comes up against wall 86, 87 of the recess, after which the force-transmitting coupling between drive source and spindle 30 is effected.

Shown in FIG. 5B is how cam member 75 is received in the larger recess 85 and has freedom of rotation in tangential direction, whereby cam member 75 can make some angular rotation from wall part 87 to wall part 86 before bringing about a force-transmitting coupling between the drive source and spindle 30 via the mechanical reduction transmission. Through interposing of the mechanical reduction transmission the drive source can hereby make several rotations before the space which cam member 75 has in tangential direction has been traversed. The drive source is hereby able to reach a certain rotation speed before a torque is transmitted to spindle 30. In an alternative embodiment (not shown) the cam member is not carried into a recess as described above, but additional receiving cams are provided which are coupled to the bearing flange and wherein the distance between the receiving cams is greater in tangential direction than the size of the cam member.

In an alternative embodiment (not shown) the clutch is embodied as a slip clutch, which slip clutch couples the power source in per se known manner to the spindle. In this alternative embodiment the clutch is positioned between the drive source and the mechanical reduction transmission such that the drive source can reach a certain rotation speed before the torque is transmitted from the drive source to the spindle.

In addition to a driving from a single (electric) motor, driving can also be realized with different motors. A variable transmission in particular can thus be advantageously realized wherein each of the motors has a different transmission ratio relative to the spindle. This is illustrated in FIG. 4D.

This variable transmission is still a three-stage planet system, although the first stage closest to the main motor, as well as being driven centrally by the main motor itself, is also driven by a second motor 22' (see FIG. 2B). This can be a ring motor (as indicated in the figure with an arrow) or a motor placed parallel but eccentrically. By giving the first stage a rotation speed on the outer side the total output speed of the first stage is also much higher, and thereby also the speed of the subsequent stages. Stages two and three do however have a static outer gear ring.

The first stage need restrain only a limited torque and can therefore be driven with a relatively light motor. This is possible as long as there is not too much resistance at the output of the transmission, i.e. as long as the tool is not yet heavily loaded. If resistance occurs at the output of the tool, for instance because cutting with shears begins to become more difficult, this second motor will be overloaded and will be mechanically or electronically uncoupled. In addition, the first stage will then also be blocked in order to prevent it moving in the opposite direction so that the tool could actuate in reverse. This is controlled mechanically in the tool with a brake which will lock. Stopping of the motor is controlled electronically.

The speed of the first stage does not affect the output of the main motor. With a variable transmission very short opening/closing times of a tool can be achieved under no load conditions. With the tool shown here an opening/closing time of 5 to 6 seconds can be achieved, as against 25 to 30 seconds with a non-variable transmission from only a main motor.

In order to prevent damage to the screw it is recommended that, when under load, the drive body cannot come into contact with a bearing flange of the axial bearing assembly. This prevents damage to the bearing and, in the extreme case, even jamming of the whole rescue tool. A stop mechanism can be provided for this purpose in the rescue tool. This stop mechanism can comprise an end stop at the position of the screw spindle or an end stop in the optionally exchangeable implement. In the implement such an end stop comprises for instance a protrusion which limits the implement drive member in translation direction in order to limit a stroke of the drive body such that in operation the drive body cannot come close to the bearing flange of the axial bearing assembly. Because the freedom of movement of the drive body is limited at the position of the implement, and not (only) at the position of the spindle, the construction of this stop mechanism can be given a less complex form while damage to the construction is prevented.

Figure 6A:
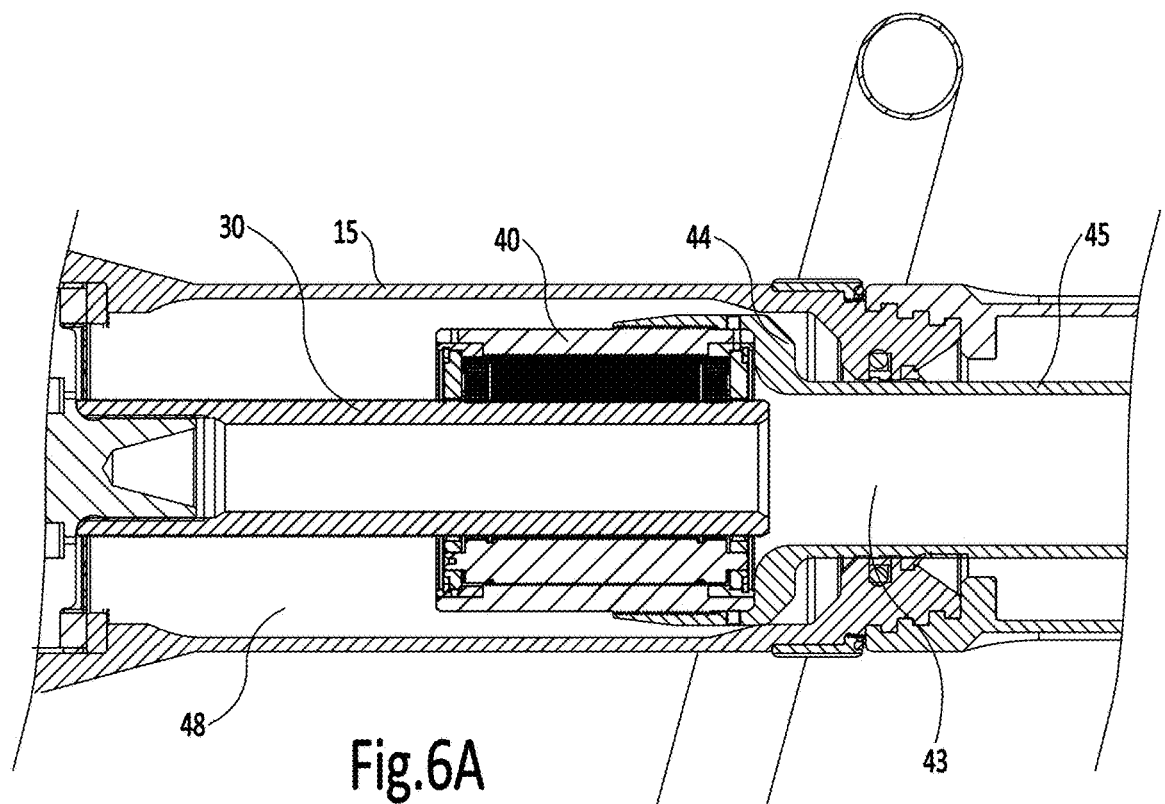
FIG. 6A shows a detail section of the drive system of the rescue tool of the foregoing exemplary embodiments.

A limitation is also imposed on an outward stroke of drive body 40 by an end stop 44. This is further shown in FIGS. 6A and 6B. In FIG. 6A this is shown for the drive system as applied in the tool of the above described examples. Drive body 40 with the planetary roller nut is provided here on a front side with a widened portion 44 for the purpose of forming a stop which, in a furthest outward stroke, comes up against the edge of an exit opening 43 of chamber 48 in which spindle 33 is received. This is the opening through which drive rod 45 moves outside chamber 48. In this outermost position drive body 40 with the planetary roller nut still lies substantially wholly in chamber 48, i.e. behind opening 43.

Figure 6B:
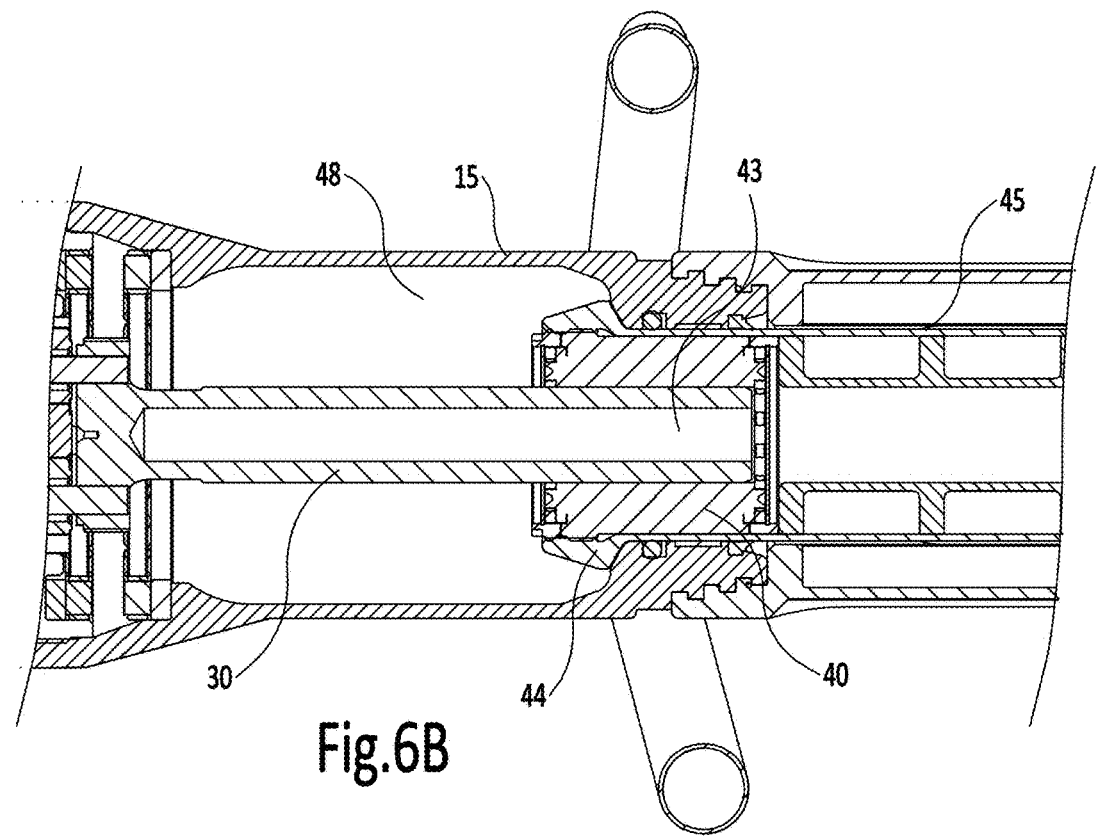
FIG. 6B shows a detail section of an alternatively embodied drive system which can be applied in the rescue tool according to one or more of the foregoing exemplary embodiments.

FIG. 6B shows an advantageous alternative embodiment wherein a smaller size of planetary roller nut is applied and the dimensions of drive body 40 are also smaller. The drive body can hereby even remain within an outer dimension of drive rod 45 and move partially outside chamber 48 together therewith through the exit opening. In this case the drive body is provided on a rear side with a widened portion 44 which serves as stop with which in a furthest outward stroke the drive body comes up against the edge of exit opening 43. The drive body 40 with planetary roller nut applied here typically has a length in the order of between 50 and 80 mm, which length can be wholly or partially added to the stroke the drive rod. Chamber 48 can hereby be considerably shorter and the tool as a whole significantly more compact. A length reduction in the order of 68 mm can thus be realized in this embodiment.

Although the invention has been further elucidated on the basis of several exemplary embodiments, it will be apparent that the invention is by no means limited thereto. On the contrary, many variations and embodiments are still possible within the scope of the invention for a person with ordinary skill in the art. Optional right-angled placing of the rear handgrip is thus interchangeable in each shown exemplary embodiment. Whether or not the electrical power supply is detachable is likewise a free choice in all shown exemplary embodiments.

The invention claimed is:

1. Rescue tool comprising a drive system which is provided inside a housing and which is configured and suitable for actuating a linear displacement of an implement drive member,
   wherein the drive system is connected for axial rotation to a rotation shaft of an energizable drive source,
   wherein the rotation shaft of the drive source is coupled for force transmission to an axially rotatable spindle,
   wherein the spindle is coupled rotatably to the housing by means of an axial bearing assembly,
   wherein a linearly movable drive body is coupled for force transmission to the spindle and is configured and suitable for converting an axial rotation of the spindle to a linear translation of the drive body,
   wherein the drive body is coupled for force transmission to the implement drive member,
   wherein said axial bearing assembly comprises a first bearing flange adjacent to the spindle and a second bearing flange substantially parallel relative to the first bearing flange and wherein rotatable elements are received between the first bearing flange and the second bearing flange, such that in operation axially transmitted forces from the spindle are absorbed by said axial bearing,
   wherein the drive body comprises a planetary roller of a planetary roller-spindle mechanism, which planetary roller is suspended for axial rotation in rolling contact with the spindle and is arranged over the spindle,
   wherein a hollow drive rod is provided which extends on a first side in force-transmitting manner from the drive body and is coupled, or at least can be coupled, on a second, opposite side in force-transmitting manner to the implement drive member,
   wherein the drive rod and the drive body lie coaxially around the spindle and at least substantially fully enclose the spindle in a retracted position of the drive rod,
   wherein the rotation shaft of the drive source is coupled for force transmission to the spindle via a mechanical reduction transmission,
   wherein the mechanical reduction transmission comprises at least one planetary gear mechanism,
   wherein a central driven gear in the mechanical reduction transmission engages on at least one planet gear arranged there around,
   wherein said spindle lies substantially co-axial with said rotation shaft of said drive source,
   wherein said mechanical reduction transmission is coupled rotatably to said axial bearing assembly,
   wherein said drive source comprises at least a first energizable motor to drive the central driven gear of the planetary gear mechanism of the mechanical reduction transmission and having a first transmission ratio relative to said spindle, and a second energizable motor to drive an outer ring gear of the planetary gear mechanism of the mechanical reduction transmission and having a second transmission ratio relative to said spindle,
   wherein said first transmission ratio is different from said second transmission ratio;
   wherein the second energizable motor is to drive the outer ring gear in a same direction as the first energizable motor drives the central driven gear, so as to increase an output speed of the planetary gear mechanism and a corresponding output speed of the spindle; and
   wherein in operation the second energizable motor is controlled to drive the outer ring gear until resistance from the output mechanical reduction transmission causes the second energizable motor to be overloaded and then mechanically or electronically uncoupled, while operation of the tool proceeds by the first energizable motor driving the central driven gear of the planetary gear mechanism of the mechanical reduction transmission.

2. Rescue tool as claimed in claim 1, wherein the planetary roller and the spindle comprise mutually engaging contact means in the form of a screw thread, which screw thread is arranged or shaped in helical form having a triangular cross section with an apex angle at a top of 90 degrees.

3. Rescue tool as claimed in claim 1, wherein the bearing elements are arranged such that a rotation direction is followed around a rotation axis substantially at right angles to the rotation shaft of the spindle.

4. Rescue tool as claimed in claim 1, wherein the spindle is connected rotatably to a radial bearing for the purpose of absorbing forces transmitted radially onto the rotation shaft.

5. Rescue tool as claimed in claim 1, further comprising an electric power supply in or on the housing to power the first and second energizable motors.

6. Rescue tool as claimed in claim 1, wherein a mechanical braking device is provided between the spindle and the energizable drive source, wherein the mechanical braking device is actuatable to counteract a rotation of the spindle.

7. Rescue tool as claimed in claim 1, wherein a mechanical braking device is provided between the mechanical reduction transmission and the energizable drive source, wherein the mechanical braking device is actuatable to counteract a rotation of the spindle.

8. Rescue tool as claimed in claim 1, wherein a clutch is provided between the drive source and the spindle.

9. Rescue tool as claimed in claim 8, wherein the clutch is a fixed clutch and is coupled on the one hand for force transmission to the output shaft of the mechanical reduction transmission and is coupled on the other side for force transmission to the spindle, and wherein the fixed clutch is embodied such that in operation the rotation shaft of the drive source makes several rotations before the spindle is driven in force-transmitting manner.

10. Rescue tool as claimed in claim 1, wherein the spindle is received inside a hollow chamber and the drive rod moves outside the chamber via a close-fitting exit opening, wherein a stop comes up against an edge of the opening in an extreme position of the drive rod, wherein the stop is provided on a side of the drive body remote from the exit opening and the drive body likewise moves at least partially outside the exit opening in the extreme position of the drive rod.

11. Rescue tool as claimed in claim 1, wherein a quick-connect mechanism is provided such that an implement can be exchangeably arranged such that, when it is arranged, a force-transmitting coupling results between the implement and the implement drive member.

* * * * *